March 11, 1930. W. S. BAILEY 1,750,342
CARBON MONOXIDE CONSUMER
Filed Feb. 29, 1928

Inventor
Wells S. Bailey,
Owen + Owen
Attorneys

Patented Mar. 11, 1930

1,750,342

UNITED STATES PATENT OFFICE

WELLS S. BAILEY, OF DETROIT, MICHIGAN

CARBON-MONOXIDE CONSUMER

Application filed February 29, 1928. Serial No. 257,817.

This invention relates to a carbon monoxide consumer which is adapted to be connected with a gasoline engine, such as is used in automobiles.

The primary object of the invention is to obviate the dangerous conditions commonly resulting from the pollution of the atmosphere by the discharge of carbon monoxide, occasioned by the incomplete combustion of the motor fuel. An incidental, but important, advantage of the invention is that the carbon monoxide, which is discharged through the exhaust pipe, is returned to the intake manifold, after being enriched so as to promote further combustion thereof thus making it possible to obtain more power therefrom and greatly increasing the mileage which may be obtained from a given amount of fuel.

The specific construction of the invention, together with its mode of operation, will be more particularly explained in connection with the accompanying drawings, which illustrate one embodiment thereof.

Figures 1, 2, 3, 4:
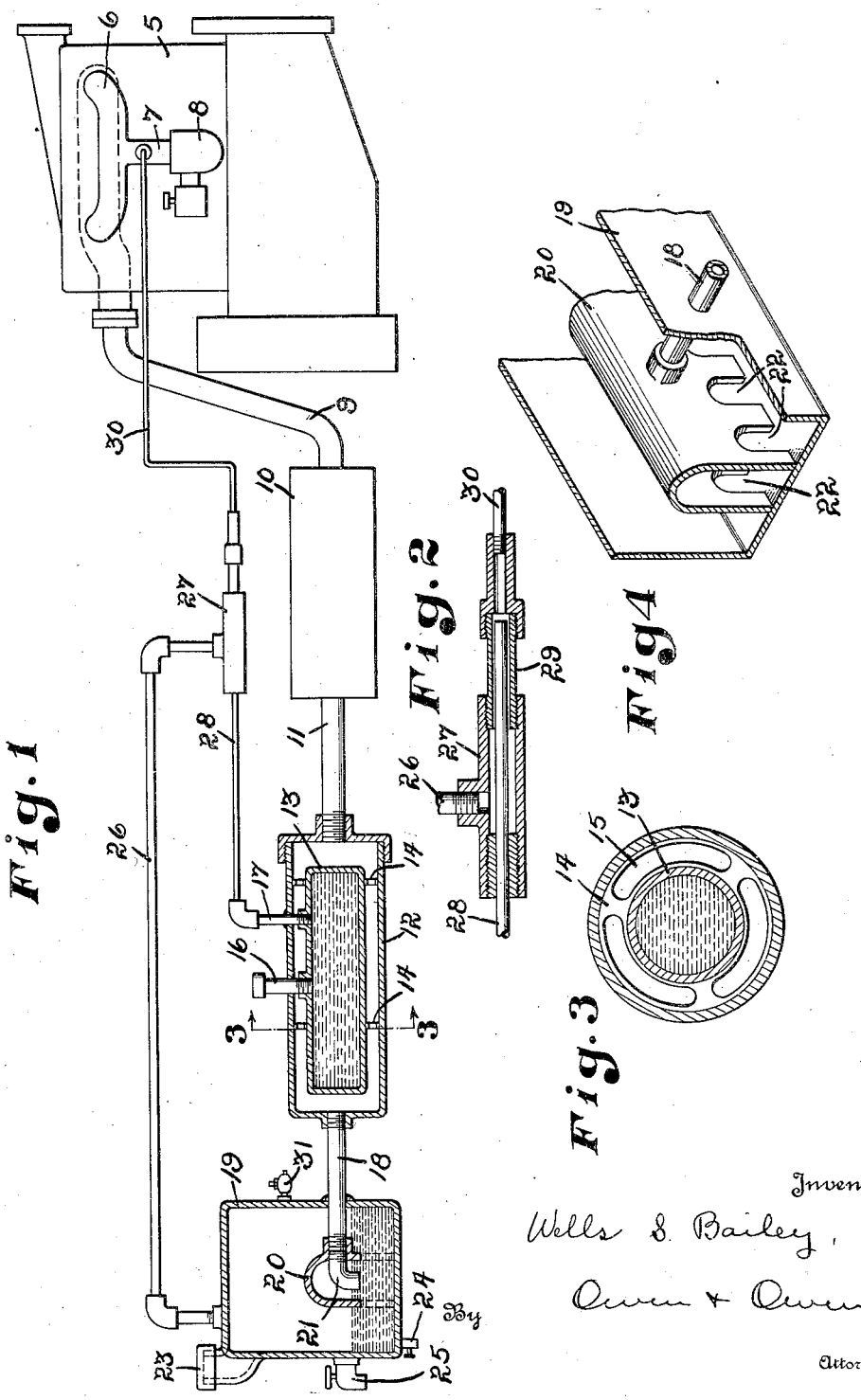
Figure 1 is a conventional view illustrating the complete invention, some parts being shown in elevation and other parts in section.
Fig. 2 is a longitudinal sectional view of the mixer where the carbon monoxide is enriched by the addition of alcohol vapor.
Fig. 3 is a section taken on the line 3—3 of Fig. 1.
Fig. 4 is a detail perspective view showing a portion of the purifying tank.

The invention, as shown herein, is associated with a gasoline engine 5 having an intake manifold 6 connected with a mixing chamber 7 and a carburetor 8. The engine is provided with an exhaust pipe 9 leading to a muffler 10 to which is connected a discharge pipe 11.

According to the invention a chamber 12 is connected to the outlet end of the pipe 11 and encloses a tank 13 which is adapted to contain alcohol. The tank 13 is disposed centrally of the chamber 12 and is held in position by any suitable means, such as spacer rings 14 which are provided with openings 15 to permit the passage of the exhaust gases as they are discharged from the pipe 11. The tank 13 is provided with a suitable filler pipe 16 and a discharge pipe 17. As the hot exhaust gases pass through the chamber 12 the alcohol contained within the tank 13 is partially vaporized and passes out through the pipe 17.

The chamber 12 is provided with an outlet pipe 18 which leads into a purifying tank 19 adapted to contain water or some liquid purifying agent which will absorb or combine with the carbon dioxide and will permit the carbon monoxide to pass through. This liquid will also absorb the greater part of the water, resulting from the oxidation of the hydrogen contained in the fuel. In its preferred form, the tank 19 is provided internally with a trough 20 within which the discharge end 21 of the pipe 18 extends beneath the surface of the liquid contained in the tank. The sides of the trough 20 are provided with numerous ports 22, normally beneath the surface of the liquid, through which the carbon monoxide may pass into the upper part of the tank. The tank 19 is provided with a filler mouth 23 in its top and with a drain or pet cock 24 in its bottom. A pet cock or valve 25 is also provided in the side of the tank 19 in order that the liquid within the tank may be kept at the proper level. If necessary, a safety valve 31 may also be provided in the tank 19.

As the exhaust gases continue to be discharged into the tank 19 the carbon monoxide is expelled therefrom through a pipe 26 through which it passes to a mixer 27. The alcohol vapor which is expelled from the tank 13 through the pipe 17 passes thence through a pipe 28 of smaller diameter. This pipe 28 is disposed centrally of the mixer 27, extending into a reduced extension 29 of the mixer, where it is discharged centrally of the stream of carbon monoxide. The carbon monoxide is thus enriched by the alcohol and the resulting mixture passes through a pipe 30 into the mixing chamber 7 and there mixes with the fresh fuel from the carburetor 8.

In the operation of this invention, all of the carbon monoxide which is discharged from the pipe 11 is subsequently returned to the inlet manifold, after being enriched by the addition of alcohol vapor containing hydrogen atoms, which renders the mixture more easily combustible. By this process, all of the fuel is eventually oxidized completely and the maximum amount of power is obtained therefrom, resulting in the greatest possible amount of mileage from the fuel consumed. At the same time, no poisonous monoxide gas is permitted to escape into the atmosphere to endanger the health and the lives of people in the vicinity.

While I have shown and described one form in which the invention may be embodied, it is to be understood that this is merely for the purpose of illustration, and that various modifications may be made in the size, shape and relative arrangement of the various parts without any material departure from the scope of the invention as claimed.

What I claim is:

1. The combination with the intake manifold and exhaust pipe of a gasoline engine, of a main fuel supply conduit connected with the intake manifold, a chamber through which the exhaust gases pass as they are discharged from said exhaust pipe, a tank within said chamber for containing alcohol to be vaporized by heat from the exhaust, means tending to remove from the exhaust gases the products of combustion other than carbon monoxide, means for conducting the purified carbon monoxide to the intake manifold, and means for discharging the vaporized alcohol centrally into the stream of purified carbon monoxide before the latter reaches the intake manifold.

2. The combination with the intake manifold and exhaust pipe of a gasoline engine, of a main fuel conduit connected with the intake manifold, a chamber through which the exhaust gases pass as they are discharged from said exhaust pipe, a tank within said chamber for containing alcohol to be vaporized by heat from the exhaust gases passing through said chamber, a purifying tank into which the exhaust gases are directed, means in said purifying tank to free the carbon monoxide from a considerable part of the other products of combustion, a conduit for delivering the purified carbon monoxide to the intake manifold, said conduit including a cylindrical mixer, and means for delivering the alcohol vapor from said first mentioned tank centrally of said mixer into the stream of carbon monoxide to mix with the latter before it reaches the intake manifold.

In testimony whereof, I have hereunto signed my name to this specification.

WELLS S. BAILEY.